United States Patent [19]

Benrud

[11] B 3,983,453
[45] Sept. 28, 1976

[54] SWITCHABLE CONSTANT CURRENT SINK

[75] Inventor: Vernal M. Benrud, Minneapolis, Minn.

[73] Assignee: Sperry Rand Corporation, New York, N.Y.

[22] Filed: May 8, 1974

[21] Appl. No.: 467,971

[44] Published under the second Trial Voluntary Protest Program on January 13, 1976 as document No. B 467,971.

[52] U.S. Cl. ................................ 315/399; 315/367
[51] Int. Cl.² ..................... H01J 29/70; H01J 29/76
[58] Field of Search ................... 315/367, 387–389, 315/399

[56] References Cited
UNITED STATES PATENTS

| | | |
|---|---|---|
| 3,431,457 | 3/1969 | Hinkein et al. .................. 315/367 |
| 3,435,278 | 3/1969 | Carlock et al. .................. 315/367 |
| 3,582,705 | 6/1971 | Waller .......................... 315/367 |

*Primary Examiner*—Maynard R. Wilbur
*Assistant Examiner*—T. M. Blum
*Attorney, Agent, or Firm*—Kenneth T. Grace; Thomas J. Nikolai; Marshall M. Truex

[57] ABSTRACT

A constant current sink for a cathode ray tube (CRT) display system is disclosed. The display system includes X and Y deflection coil current drive systems including parallel coupled constant current sinks that establish the deflection-determining current levels that flow through the X and Y deflection coils. Each constant current sink draws a fixed current level, and one or more are selectively switched ON, i.e., caused to draw a fixed current level through the deflection coil load from a first power supply, or OFF, i.e., caused to draw the fixed current level from a second power supply, to establish the desired electron beam position on the CRT. Means are provided for correcting for the pin-cushion, i.e., non-linear, effects associated with a flat CRT face.

6 Claims, 5 Drawing Figures

SWITCHABLE CONSTANT CURRENT SINK

BACKGROUND OF THE INVENTION

Circuitry for the positioning of the electron beam in CRT display systems such as exemplified by the M. S. Granberg, et al., U.S. Pat. Nos. 3,434,135 and 3,489,946 includes X and Y deflection coil current drive systems of various designs. These prior art systems include digital logic that selectively switches in or out constant current sources of individually fixed but separately different incremental current magnitudes or levels such that the desired deflection-determining current level is caused to flow through the X (and Y) deflection coil.

In CRT display systems, the cathode ray tube face is usually a flat surface. Equal increments of deflection-determining current move the electron beam along the face in increasing incremental lengths for increasing distances away from the center of the face producing a distortion called the "pin-cushion" or "non-linear effect." Prior art CRT display systems have included various correction features to compensate for such distortion. Aslo included were constant current drivers and electronic switches to maintain fixed increments of deflection-determining current and to prevent switching induced transients that further distort the display. The present invention is directed toward a CRT display system that eliminates these above noted causes of display distortion.

SUMMARY OF THE INVENTION

The present invention is directed toward a CRT display system that includes a constant current sink that substantially eliminates transient variations in the deflection-determining current level which are due to the selective coupling, or switching, of a constant current sink to the X or the Y deflection coils. A plurality of the current sinks are coupled in parallel to one end of the, e.g., X deflection coil, the other end of which is coupled to a voltage source V. All of the current sinks are of substantially the same circuit design except for a current limiting resistor R, the individual values of which are varied such that each current sink passes a fixed increment of deflection-determining current. The parallel coupled current sinks are controlled by X deflection logic to pass the desired deflection-determining current level, i.e., the sum of the increments of the deflection-determining currents passed by the switched ON current sinks, through the deflection coil and to thereby position the electron beam at the desired X distance from the center of the CRT face.

The constant current sinks require a reference voltage $V_{REF}$. The reference voltage $V_{REF}$ is adjusted by a digital-to-analog converter and an independent correction module to generate a new corrected reference voltage $V_{REFX}$. This corrected reference voltage $V_{REFX}$ is then coupled to the current sinks to adjust the passed current increments, and, in turn, to correct for pin-cushion or nonlinear effects of the CRT face upon the electron beams. Each constant current sink draws a corrected current increment, and, one or more are selectively switched ON, i.e., caused to draw a corrected current increment through the deflection coil load from a first power supply, or OFF, i.e., caused to draw the corrected current increment from a second power supply to establish the desired electron beam position on the CRT face while eliminating transient variations in the deflection-determining current level which variations are due to the selective coupling or switching of the constant current sinks to the X deflection coil.

DESCRIPTION OF THE PREFERRED EMBODIMENT

Figure 1:
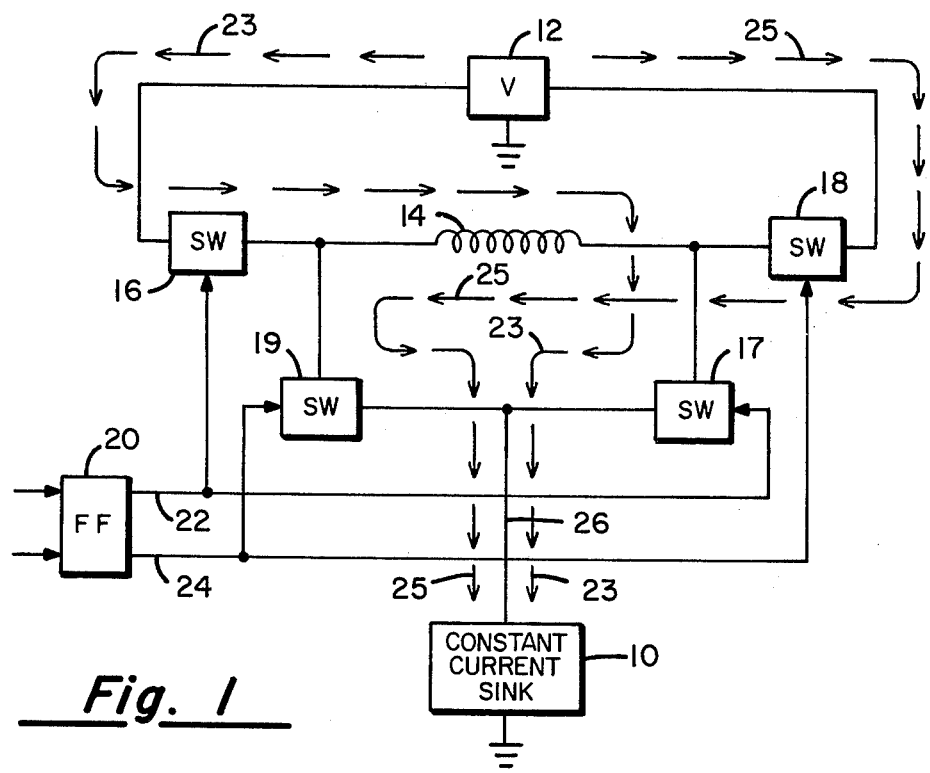
FIG. 1 is a block diagram of the CRT display system X (or Y) deflection coil driving system in which the present invention is incorporated.

With particular reference to FIG. 1 there is presented a block diagram of the CRT display system X (or Y) deflection coil driving system in which the present invention is incorporated. In the subsequent discussion it is assumed that unless otherwise specified both the X and Y deflection coil driving systems are substantial duplicates one of the other. In the embodiment of FIG. 1, there is provided a source 12 of voltage V which is the source of the driving current for X deflection coil 14. Current flow through coil 14 is determined by current switches (SW) 16, 17 and 18, 19 all under control of flip-flop (FF) 20. When flip-flop 20 activates line 22, current switches 16, 17 are activated, or closed, causing the current signal schematically represented by line 23 to flow from voltage source 12 through current switch 16, through coil 14 in the left-to-right direction, through current switch 17, and via line 26 through constant current sink 10. Alternatively, when flip-flop 20 activates line 24, current switches 18, 19 are activated causing voltage source 12 to cause the current signal represented by line 25 to flow through current switch 18, coil 14 in a right-to-left direction, through current switch 19 and via line 26 through constant current sink 10. The operation is that of a bipolar current signal generator, with respect to coil 14, similar to that of the R. C. Green, et al., U.S. Pat. No. 3,243,606.

Figure 2:
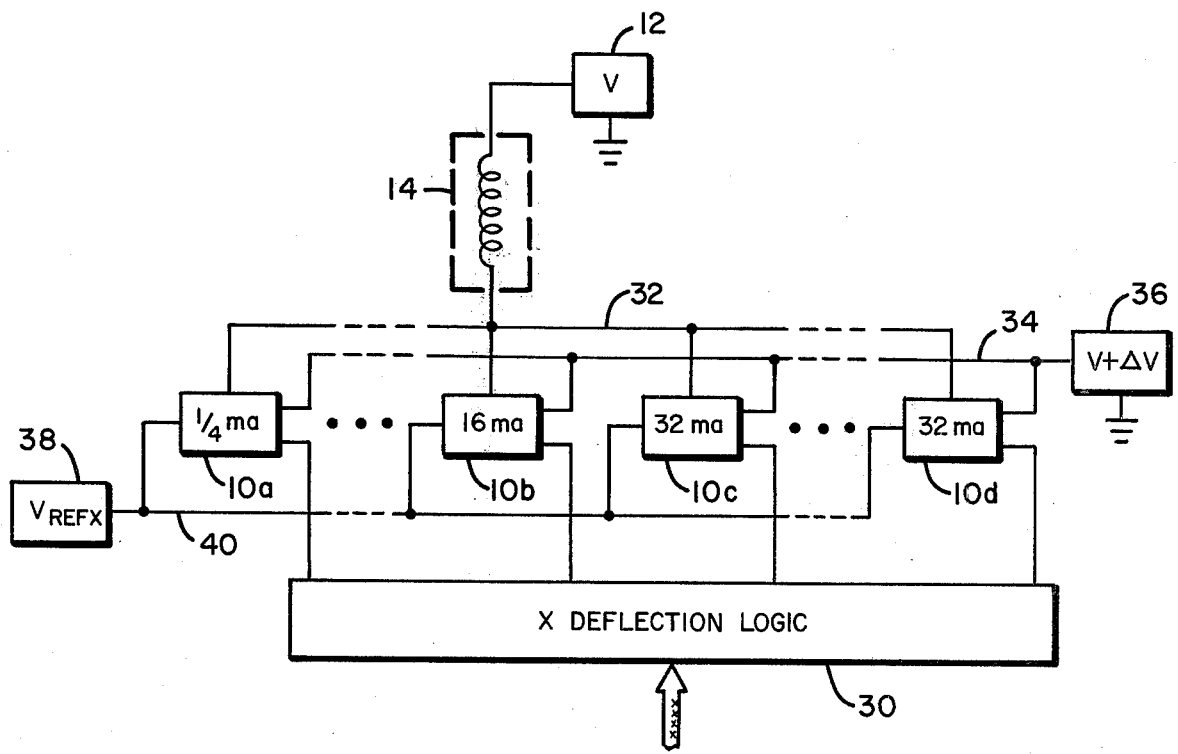
FIG. 2 is a simplified block diagram of an X deflection coil driving system incorporating the constant current sink of the present invention.

With particular reference to FIG. 2 there is presented a block diagram of an X deflection coil driving system incorporating the constant current sink 10 of the present invention. A plurality of the current sinks 10a, 10b, 10c, 10d are coupled in parallel to one end of coil 14, the other end of which is coupled to a voltage source 12. All of the current sinks 10a, 10b, 10c, 10d are of substantially the same circuit design except for a current limiting resistor R, the individual values of which are varied such that each current sink passes an increment of deflection-determining current. That is, in the embodiment of FIG. 2 current sink 10a passes an increment of ¼ milliamperes (ma), current sink 10b passes an increment of 16 ma, current sink 10c passes an increment of 32 ma and current sink 10d passes an increment of 32 ma.

The parallel coupled current sinks are, in turn, controlled by X deflection logic 30 whereby a selected none, or one or more of such current sinks are enabled to pass their corresponding increments of deflection-determining current signals. The algebraic sum of the individual increments of deflection-determining current signals passed by the enabled current sinks pass from voltage source 12 through coil 14 to position the electron beam at the desired X distance from the center of the CRT face. Each current sink continuously, while power is switched on, draws an increment of current therethrough: when the current sink is enabled by X deflection logic 30 it is caused to draw its increment of current through the deflection coil 14 via line 32 while, alternatively, when the current sink is not enabled by X deflection logic 30 it is caused to draw the same current increment through line 34 from V +ΔV voltage source 36 in much the same manner as that of the J. E. Thornton U.S. Pat. No. 3,148,357. Additionally provided is a $V_{REFX}$ source 38 which via line 40 couples a corrected reference voltage $V_{REFX}$ to the current sinks which reference voltage adjusts the magnitude of the current increments to compensate for pin-cushion or nonlinear effects of the CRT face upon the electron beam. Thus, it is apparent that by enabling none or all of the current sinks the electron beam may be caused to remain at the center or to move to the maximum X deflection position, respectively, on the CRT face. Note that many deflection logic configurations are available in the prior art, some of which are exemplified by the above-referenced M. L. Granberg, et al, patents.

Figure 3:
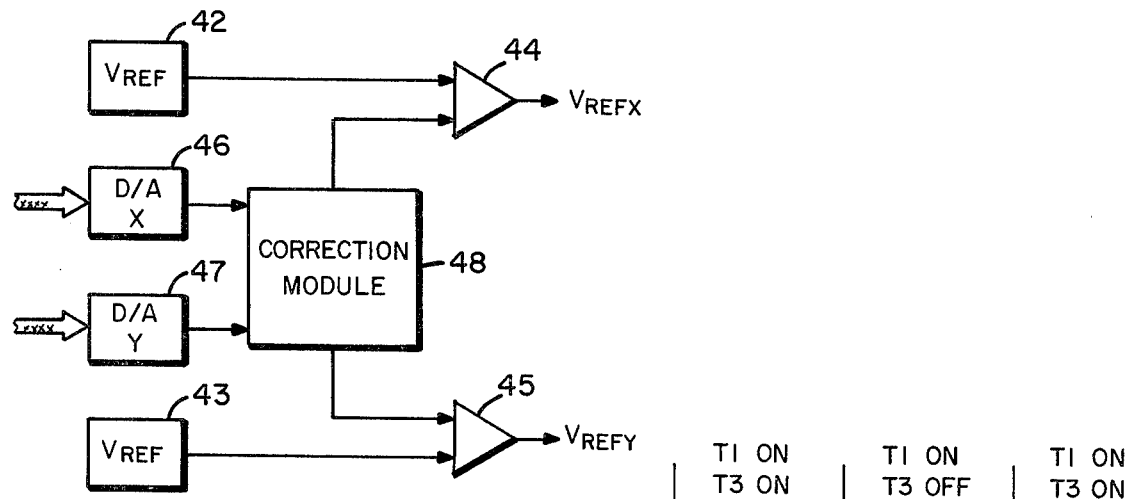
FIG. 3 is a block diagram of the correction system for generating the adjusted reference voltage that is coupled to the current sink of the present invention to compensate for pin-cushion or nonlinear effects of the CRT.

With particular reference to FIG. 3 there is presented a block diagram of a correction system for generating the adjusted reference voltage $V_{REFX}$ (and $V_{REFY}$) utilized by the current sinks of the present invention and denoted as source 38 in FIG. 2. In this configuration there are provided two constant voltage sources 42, 43 of reference voltages $V_{REF}$, which may or may not be of identical magnitudes, which are coupled as first inputs to their associated summing operational amplifiers 44, 45, respectively. Additionally provided are two digital-to-analog converters 46, 47 for converting the digital representations of a desired position or address of the electron beam in the X, Y directions, respectively, to corresponding analog signal amplitudes/polarities which are, in turn, coupled to correction module 48. Correction module 48, which in the preferred embodiment of the present invention is a Model C100, C101, CRT, Geometry/Focus Correction Module, purchased from Intronics, 57 Chapel Street, Newton, Mass., 02153, from the outputs of D/A converters 46, 47 generates corresponding correction voltages which are coupled as second inputs to the corresponding summing operational amplifiers 44, 45, respectively. Summing operational amplifier 44, 45, in turn, provide as their outputs the respective corrected reference voltages $V_{REFX}$, $V_{REFY}$, respectively, which are required for the operation of the current sinks of the present invention to correct for pin-cushion or nonlinear effects of the electron beam of the CRT associated with the X deflection coil 14 of FIGS. 1, 2.

Figure 5:
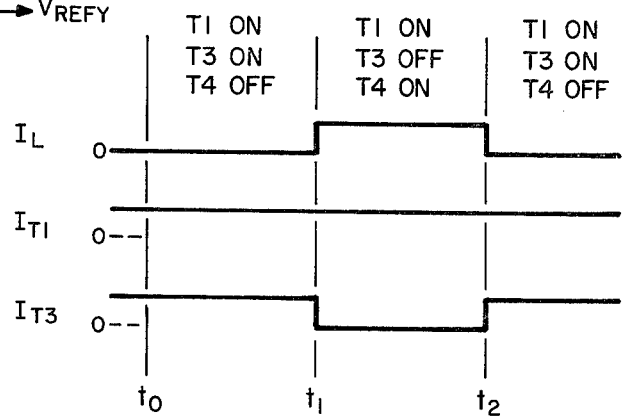
FIG. 5 is a timing diagram of the current wave forms associated with FIG. 4.
Figure 4:
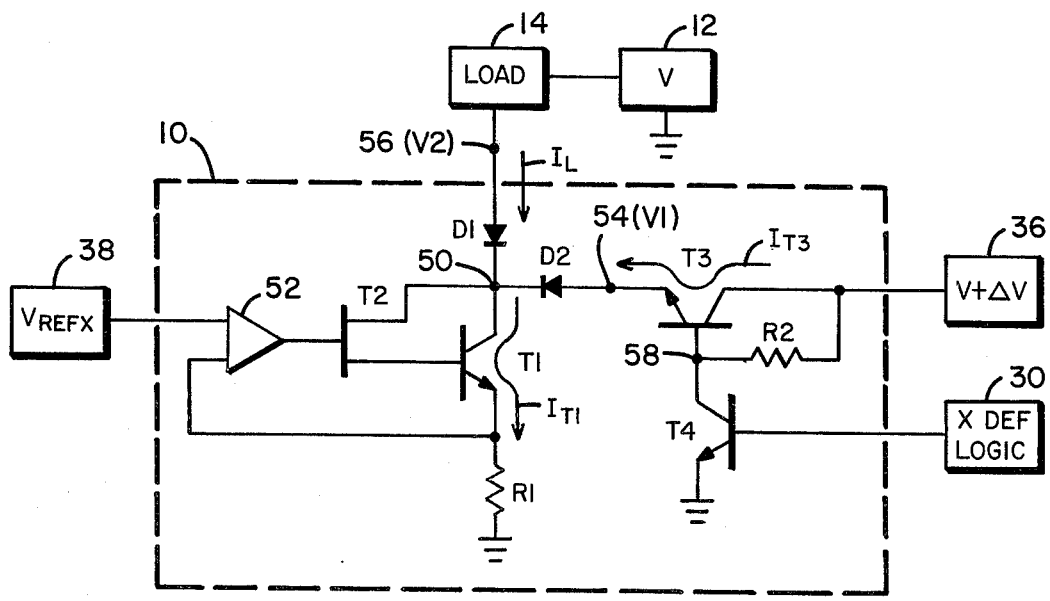
FIG. 4 is the circuit schematic of the constant current sink of the present invention.

With particular reference to FIG. 4 there is presented the circuit schematic of the constant current sink of the present invention while FIG. 5 is an illustration of the timing diagram of the current signal wave forms associated with FIG. 4. In FIG. 4, in which elements previously discussed with particular reference to FIGS. 1, 2, 3 are denoted by like reference numbers, transistor T1 is always forward biased ON such that a constant current signal $I_{T1}$ always flows from node 50 across the collector-emitter electrodes of transistor T1, through resistor R1 and is then coupled directly to ground. As used herein the terms "coupled directly" or "directly coupled" shall mean that there are no discrete circuit elements, such as a resistor, capacitor, inductor, etc., that are coupled intermediate the two elements so directly coupled. The circuit of current sink 10 operates to switch the source of current signal $I_{T1}$ as being source 12 of voltage V represented by current signal $I_L$ flowing through the load of coil 14 and diode D1 or, alternatively, source 36 of voltage V +ΔV represented by current signal $I_{T3}$ flowing through the collector-emitter electrodes of transistor T3 and diode D2. Additionally, as was discussed above, source 38 couples as a first input to operational amplifier 52 an adjusted reference voltage $V_{REFX}$ that is generated by a correction circuit such as represented by FIG. 3 whereby operational amplifier 52 controls the gate electrode of FET transistor T2 to bias the base-emitter junction of transistor T1 for adjusting the magnitude of the current signal $I_{T1}$ to correct for the pin-cushion and nonlinear effects of the planar CRT face.

Initially, in referring to FIG. 5, assume that at time $t_0$ X deflection logic 30 reverse biases the base-emitter junction of transistor T4 turning transistor T4 OFF. This, through resistor R2, causes source 36 to forward bias the base-emitter junction of transistor T3 coupling the voltage V +ΔV to the anode of diode D2 which, at its cathode at node 50 sees the voltage V from source 12. Accordingly, when transistor T3 is switched ON, diode D2 is forward biased while diode D1 is reverse biased causing the current $I_{T3}$ to flow through node 50 through transistor T1 as current $I_{T1}$ and thence through resistor R1 to ground. Accordingly, it can be seen that the voltage V +ΔV from source 36 is selected to be of such a magnitude with respect to the voltage V from source 12 that with transistor T3 ON the voltage V1 at node 54 is greater than the voltage V2 at node 56. With respect to resistor R1 it can be seen that its magnitude and $V_{REFX}$ determine the magnitude of $I_{T1}$. Accordingly, it can be seen that the selection of resistors R1 of different magnitudes permits, in a configuration of FIG. 2, the generation of current sinks 10 of differing passed current signal magnitudes. As an example, in the preferred embodiment of the present invention there were utilized 70 parallel coupled current sinks 10 to lines 32, 34, 40 to pass the following individual increments of deflection-determining current signals:

¼ ma, ½ ma, 1 ma, 2 ma, 4 ma, 8 ma, 16 ma, 32 ma, 32 ma . . . 32 ma, 32 ma. Using these current signal magnitudes (as adjusted through $V_{REFX}$ source 38), the enabling of none, one, more than one, or all of the current sinks 10 by X deflection logic 30 permits the precise, uniform step-wise movement of the electron beam in the X direction across the CRT face without pin-cushion or nonlinear distortion.

Assume now, as at time $T_1$, that X deflection logic 30 forward biases the base-emitter junction of transistor T4 coupling the base of transistor T3, as at node 58, to ground. This reverse biases the base-emitter junction of transistor T3 turning OFF transistor T3 removing the voltage V +ΔV from node 54. Now, because the voltage V2 at node 56 is greater than the voltage V1 at node 54 diode D2 becomes reverse biased while diode D1 becomes forward biased causing the current $I_{T1}$ to be drawn through diode D1, as represented by current $I_L$, load 14 and source 12.

Now, if as at time $t_2$ X deflection logic 30 again reverse biases the base-emitter junction of transistor T4, transistor T3 is again turned ON causing the voltage V1 at node 54 to be greater than the voltage V2 at node 56 whereby diode D2 is forward biased and diode D1 is reverse biased whereby the current $I_{T1}$ through transistor T1 is again drawn through transistor T3 represented by current signal $I_{T3}$.

What is claimed is:

1. A switchable constant current sink for a CRT display system comprising:
    a first transistor T1 having collector, emitter and base electrodes;
    a first resistor R1;
    a first diode D1 having an anode and a cathode;
    means directly intercoupling the collector electrode of said first transistor T1 and the cathode of said first diode D1 for forming a first node;
    means coupling the emitter electrode of said first transistor T1 directly to a first terminal of said first resistor R1 the second terminal of which is coupled directly to ground;
    $V_{REFX}$ reference voltage source means coupled to said transistor T1 constantly forward biasing the base emitter junction of said first transistor T1 for controlling a current $I_{T1}$ to constantly flow from said first node, through said first transistor T1 and then through said first resistor R1 to ground;
    a second transistor T3 having collector, emitter and base electrodes;
    means coupling the emitter electrode of said third transistor T3 to said first node;
    a first voltage source V;
    an inductive load formed by the X deflection coil of said CRT coupled intermediate said first voltage source V and the anode of said first diode D1;
    a second voltage source V +ΔV coupled to the collector electrode of said third transistor T3;
    logic means coupled to said second transistor T3 controlling said second transistor T3 to be either conducting ON or nonconducting OFF, respectively, said ON second transistor T3 coupling said second voltage source V +ΔV to said first node and reverse biasing said first diode D1 for drawing said current $I_{T1}$ through said second transistor T3 from said second voltage source V +ΔV, or, alternatively, said OFF second transistor T3 decoupling said second voltage source V +ΔV from said first node and forward biasing said first diode D1 for drawing said current $I_{T1}$ through said inductive load from said first voltage source V.

2. The current sink of claim 1 in which said $V_{REFX}$ reference voltage source means includes:
    $V_{REF}$ constant voltage source means;
    digital-to-analog converter means for receiving the digital representations of a desired position of the electron beam of said CRT in the X direction and generating an analog signal representation thereof;
    correction module means for receiving said analog signal representation and generating a corresponding correction signal;
    operational amplifier means receiving said $V_{REF}$ constant voltage and said correction voltage and generating said $V_{REFX}$ reference voltage for controlling said first transistor T1 to adjust the magnitude of said current $I_{T1}$ to compensate for the pin-cushion effect of the electron beam as positioned on said CRT face as determined by said digital representations.

3. A switchable constant current sink for a CRT display system, comprising:
    a first transistor T1 having collector, emitter and base electrodes;
    a first resistor R1;
    first and second diodes D1 and D2, each having an anode and a cathode;
    means directly intercoupling the collector electrode of said first transistor T1, and the cathodes of said first and second diodes D1 and D2 for forming a first node;
    means coupling the emitter electrode of said first transistor T1 directly to a first terminal of said first resistor R1 the second terminal of which is coupled directly to ground;
    $V_{REFX}$ reference voltage source means constantly forward biasing the collector-emitter junction of said first transistor T1 for controlling a current signal $I_{T1}$ to constantly flow from said first node, through said first transistor T1 and then through said first resistor R1 to ground;
    a second transistor T3 having collector, emitter and base electrodes;
    means coupling the emitter electrode of said second transistor T3 directly to the anode of said second diode D2;
    a first voltage source V;
    an inductive load formed of the X deflection coil of said CRT coupled intermediate said first voltage source V and the anode of said first diode D1;
    a second voltage source V +ΔV coupled to the collector electrode of said second transistor T3;
    means controlling said second transistor T3 to be either conducting ON or nonconducting OFF, respectively, said ON second transistor T3 coupling said second voltage source V +ΔV to the anode of said second diode D2 and forward biasing said second diode D2 and reverse biasing said first diode D1 for drawing said current signal $I_{T1}$ through said second transistor T3 from said second voltage source V +ΔV, or, alternatively, said OFF second transistor T3 decoupling said second voltage source V +ΔV from the anode of said second diode D2 and reverse biasing said second diode D2 and forward biasing said first diode D1 for drawing said current signal $I_{T1}$ through said inductive load from said first voltage source V.

4. The current sink of claim 3 in which said $V_{REFX}$ reference voltage source means includes:
    $V_{REF}$ constant voltage source means;
    digital-to-analog converter means for receiving the digital representations of a desired position of the electron beam of said CRT in the X direction and generating an analog signal representation thereof;
    correction module means for receiving said analog signal representation and generating a corresponding correction signal;
    operational amplifier means receiving said $V_{REF}$ constant voltage and said correction voltage and generating said $V_{REFX}$ reference voltage for controlling said first transistor T1 to adjust the magnitude of said current $I_{T1}$ to compensate for the pin-cushion effect of the electron beam as positioned on said CRT face as determined by said digital representations.

5. A switchable constant current sink for a CRT display system, comprising:
- a first transistor T1 having collector, emitter and base electrodes;
- a first resistor R1;
- first and second diodes D1 and D2, each having an anode and a cathode;
- means directly intercoupling the collector electrode of said first transistor T1, and the cathodes of said first and second diodes D1 and D2 for forming a first node;
- means coupling the emitter electrode of said first transistor T1 directly to a first terminal of said first resistor R1 the second terminal of which is coupled directly to ground;
- $V_{REFX}$ reference voltage source means coupled to said transistor T1 constantly forward biasing the base emitter junction of said first transistor T1 for controlling a current signal $I_{T1}$ to constantly flow from said first node, through said first transistor T1 and then through said first resistor R1 to ground;
- second and third transistors T3 and T4 each having collector, emitter and base electrodes;
- a second resistor R2 having a first terminal coupled directly to the base electrode of said second transistor T3 and a second terminal coupled directly to the collector electrode of said second transistor T3;
- means coupling the collector electrode of said third transistor T4 directly to the base electrode of said second transistor T3;
- means coupling the emitter electrode of said third transistor T4 directly to ground;
- means coupling the emitter electrode of said second transistor T3 directly to the anode of said second diode D2;
- a first voltage source V;
- an inductive load formed by the X deflection coil of said CRT coupled intermediate said first voltage source V and the anode of said first diode D1;
- a second voltage source $V + \Delta V$ coupled to the collector electrode of said second transistor T3;
- logic means coupled to said third transistor T4 controlling said second transistor T3 to be either conducting ON or nonconducting OFF, respectively, said ON second transistor T3 coupling said second voltage source $V + \Delta V$ to the anode of said second diode D2 and forward biasing said second diode D2 and reverse biasing said first diode D1 for drawing said current signal $I_{T1}$ through said second transistor T3 from said second voltage source $V + \Delta V$, or, alternatively, said OFF second transistor T3 decoupling said second voltage source $V + \Delta V$ from the anode of said second diode D2 and reverse biasing said second diode D2 and forward biasing said first diode D1 for drawing said current signal $I_{T1}$ through said inductive load from said first voltage source V.

6. The current sink of claim 5 in which said $V_{REFX}$ reference voltage source means includes:
- $V_{REF}$ constant voltage source means;
- digital-to-analog converter means for receiving the digital representations of a desired position of the electron beam of said CRT in the X direction and generating an analog signal representation thereof;
- correction module means for receiving said analog signal representation and generating a corresponding correction signal;
- operational amplifier means receiving said $V_{REF}$ constant voltage and said correction voltage and generating said $V_{REFX}$ reference voltage for controlling said first transistor T1 to adjust the magnitude of said current $I_{T1}$ to compensate for the pin-cushion effect of the electron beam as positioned on said CRT face as determined by said digital representations.

* * * * *